US011021958B2

(12) United States Patent
Juh et al.

(10) Patent No.: US 11,021,958 B2
(45) Date of Patent: Jun. 1, 2021

(54) SPLIT VERNIER RING FOR TURBINE ROTOR STACK ASSEMBLY

(71) Applicant: United Technologies Corporation, Farmington, CT (US)

(72) Inventors: Christopher M. Juh, Hobe Sound, FL (US); Scott D. Virkler, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 149 days.

(21) Appl. No.: 16/176,894

(22) Filed: Oct. 31, 2018

(65) Prior Publication Data
US 2020/0131910 A1    Apr. 30, 2020

(51) Int. Cl.
*F01D 5/02*    (2006.01)
*F01D 5/06*    (2006.01)

(52) U.S. Cl.
CPC ............. *F01D 5/025* (2013.01); *F01D 5/026* (2013.01); *F01D 5/066* (2013.01)

(58) Field of Classification Search
CPC . F01D 5/025; F01D 5/026; F01D 5/06; F01D 5/066
See application file for complete search history.

(56) References Cited

U.S. PATENT DOCUMENTS

| 1,608,526 | A | * | 11/1926 | Potter | H01G 5/06 361/298.1 |
| 2,435,540 | A | * | 2/1948 | Hardy | B64C 11/36 416/207 |
| 2,482,217 | A | * | 9/1949 | Sacchini | B64C 11/06 416/156 |
| 2,533,415 | A | * | 12/1950 | Anderson | B64C 11/34 416/158 |
| 3,449,926 | A | * | 6/1969 | Hawkins | F16D 1/02 464/154 |
| 3,571,886 | A | * | 3/1971 | Corsmeier | F01D 5/026 29/270 |
| 3,688,670 | A | * | 9/1972 | Naoyuki Uno | G03B 9/58 396/503 |

(Continued)

FOREIGN PATENT DOCUMENTS

EP    2927425 A1    10/2015
EP    2930303 A1    10/2015
(Continued)

OTHER PUBLICATIONS

Extended European Search Report dated Oct. 28, 2019; Date of Completion: Oct. 18, 2019; dated Oct. 28, 2019; 42 Pages.

*Primary Examiner* — Woody A Lee, Jr.
(74) *Attorney, Agent, or Firm* — Cantor Colburn LLP

(57) ABSTRACT

A power turbine rotor assembly including a rotor shaft. The assembly also includes a rotor stack surrounding the rotor shaft. The assembly further includes a nut axially retaining the rotor stack. The assembly yet further includes a Vernier ring engaged with the nut and the rotor shaft, the Vernier ring having an inner ring, a plurality of inner tabs extending radially inward from the inner ring, and a plurality of outer tabs extending radially outward from the inner ring, the Vernier ring formed of at least two ring segments.

19 Claims, 4 Drawing Sheets

(56) References Cited

U.S. PATENT DOCUMENTS

| | | | | |
|---|---|---|---|---|
| 4,691,876 A * | 9/1987 | Kranz | ................... | F42B 10/663 244/3.22 |
| 5,257,905 A * | 11/1993 | Wynn | ................... | F01D 5/026 415/122.1 |
| 5,409,351 A * | 4/1995 | Geist | ................... | F01D 17/148 137/625.31 |
| 5,433,674 A * | 7/1995 | Sheridan | ............... | F16H 1/2809 475/346 |
| 5,890,873 A * | 4/1999 | Willey | ................... | F01D 5/225 277/303 |
| 7,097,421 B2 * | 8/2006 | Swanson | ............... | F01D 17/141 415/127 |
| 7,811,052 B2 * | 10/2010 | Guihard | ................... | F01D 5/026 415/122.1 |
| 8,707,799 B2 * | 4/2014 | Wiley | ................... | F01D 5/146 415/146 |
| 2008/0212175 A1 * | 9/2008 | Agnetti | ................... | G02B 23/16 359/429 |
| 2011/0147514 A1 * | 6/2011 | Straub | ................... | B64C 25/50 244/50 |
| 2011/0176925 A1 | 7/2011 | Anderson et al. | | |
| 2012/0107095 A1 * | 5/2012 | Juh | ................... | F01D 25/04 415/119 |
| 2013/0092036 A1 * | 4/2013 | Barrett | ................... | A63B 45/02 101/35 |
| 2013/0164117 A1 * | 6/2013 | Jones | ................... | F02K 3/075 415/127 |
| 2013/0318781 A1 * | 12/2013 | Mariano | ............... | F01D 25/285 29/700 |
| 2015/0292578 A1 * | 10/2015 | Anglin | ................... | G05G 5/24 74/577 R |
| 2015/0361901 A1 * | 12/2015 | Anglin | ................... | F01D 5/026 60/805 |
| 2015/0369123 A1 | 12/2015 | Hanrahan | | |

FOREIGN PATENT DOCUMENTS

| | | | | |
|---|---|---|---|---|
| FR | 3007789 A1 | | 1/2015 | |
| GB | 802263 A | | 10/1958 | |
| GB | 826087 A | * | 12/1959 | ........... F01D 25/246 |
| WO | 9963237 A1 | | 12/1999 | |

* cited by examiner

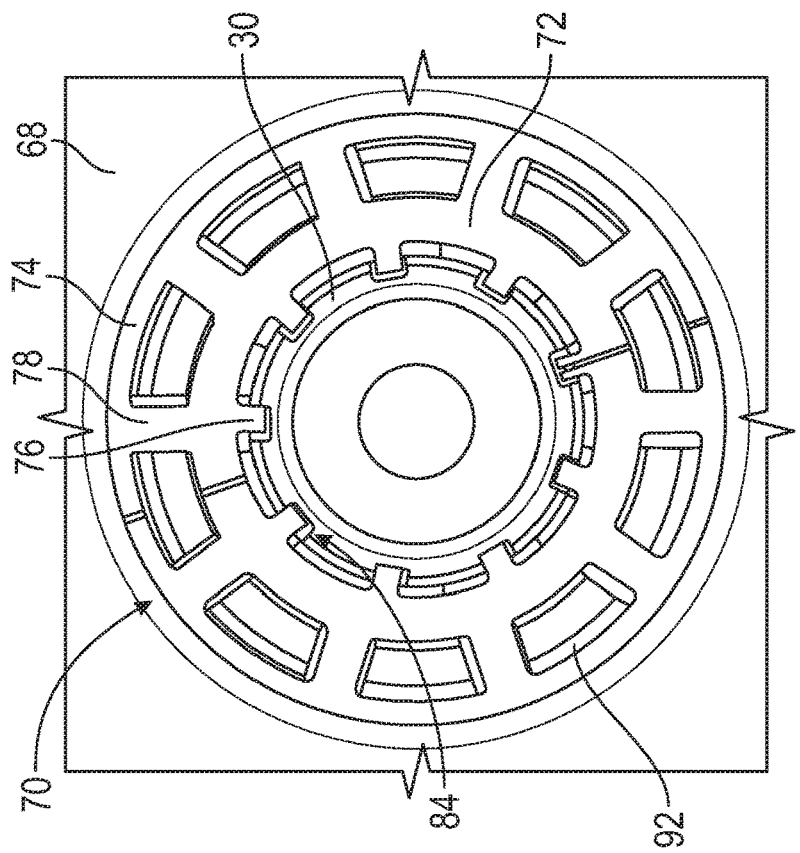
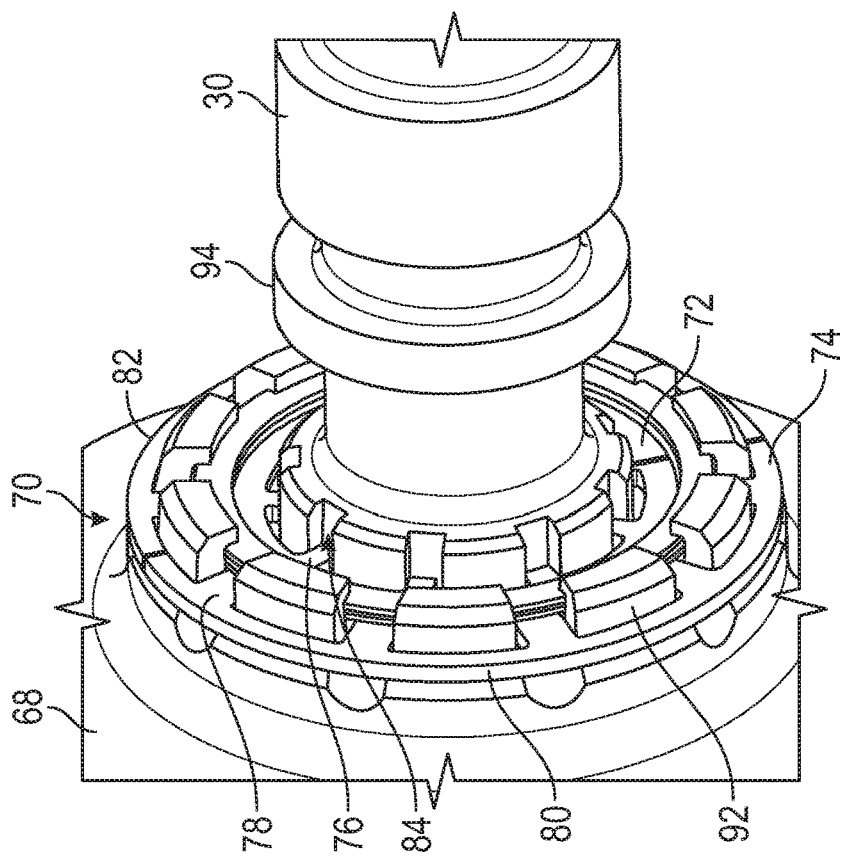
FIG. 5
FIG. 4

SPLIT VERNIER RING FOR TURBINE ROTOR STACK ASSEMBLY

STATEMENT OF FEDERAL SUPPORT

This invention was made with Government support under Contract No. W911W6-16-2-0012 awarded by the United States Army. The Government has certain rights in the invention.

BACKGROUND

Exemplary embodiments pertain to the art of turbine engines and, more particularly, to a split Vernier ring for turbine rotor stack assembly.

Turbine rotors are commonly assembled in multiple stages of blades/vanes. As such, it is common for more than one rotor to be stacked or connected to another prior to being installed onto a turbine shaft. The combination—or stacking—of several different rotor stages is known as a rotor assembly. In order to transfer the rotating torque of the rotor stage to the compressor, gearbox or similar hardware, the rotor assembly is connected to a rotating shaft.

A nut holds the rotor assembly to the shaft. The nut is required to have a form of anti-rotation to prevent the nut from unwinding during operation due to vibration. If this occurs, the stack that the nut is retaining could be loosened to the point to create unacceptable engine vibration. Typically, nuts are anti-rotated using positive features such as bent tab washers or Vernier rings. A Vernier ring is a ring that has a number of outer diameter tabs that typically engage with the nut that has protrusions and a number of inner diameter tabs that typically engage with a shaft that has slots. If properly designed, the combination of the unique number of outer diameter tabs and inner diameter tabs, and clearance to the slots, allows the Vernier ring to be installed no matter what, despite the potential for several different circumferential relationships between the nut protrusions and the shaft slots. However, the Vernier ring is a full hoop, which causes some limitations for assembly. To install a Vernier ring, all features upstream of the shaft slots must protrude to a radial distance that is radially inward of the inner diameter tabs of the Vernier ring.

BRIEF DESCRIPTION

The following descriptions should not be considered limiting in any way. With reference to the accompanying drawings, like elements are numbered alike:

Disclosed is a power turbine rotor assembly including a rotor shaft. The assembly also includes a rotor stack surrounding the rotor shaft. The assembly further includes a nut axially retaining the rotor stack. The assembly yet further includes a Vernier ring engaged with the nut and the rotor shaft, the Vernier ring having an inner ring, a plurality of inner tabs extending radially inward from the inner ring, and a plurality of outer tabs extending radially outward from the inner ring, the Vernier ring formed of at least two ring segments.

In addition to one or more of the features described above, or as an alternative, further embodiments may include an outer ring, the plurality of outer tabs extending between, and connecting, the inner ring and the outer ring.

In addition to one or more of the features described above, or as an alternative, further embodiments may include that each of the plurality of inner tabs are disposed within one of a plurality of corresponding slots defined by the rotor shaft.

In addition to one or more of the features described above, or as an alternative, further embodiments may include that each of the plurality of outer tabs are disposed between adjacent protrusions extending from the nut.

In addition to one or more of the features described above, or as an alternative, further embodiments may include that the inner ring, the outer ring, and adjacent outer tabs define a plurality of windows of the Vernier ring, each of the protrusions of the nut disposed within one of the plurality of windows.

In addition to one or more of the features described above, or as an alternative, further embodiments may include that the power turbine rotor assembly is disposed on a helicopter.

Also disclosed is a Vernier ring including an inner ring and an outer ring. The Vernier ring also includes a plurality of inner tabs extending radially inward from the inner ring, the inner tabs circumferentially spaced from each other. The Vernier ring further includes a plurality of outer tabs extending between, and connecting, the inner ring and the outer ring, the Vernier ring formed of at least two ring segments.

In addition to one or more of the features described above, or as an alternative, further embodiments may include that the Vernier ring is disposed on a helicopter.

In addition to one or more of the features described above, or as an alternative, further embodiments may include that the inner ring, the outer ring, and adjacent outer tabs define a plurality of windows.

Further disclosed is a gas turbine engine including a gas generator turbine section and a power turbine section arranged fluidly downstream from the gas generator turbine section, the power turbine mechanically disconnected from the gas generator portion. The power turbine includes a rotor shaft. The power turbine also includes a rotor stack surrounding the rotor shaft. The power turbine further includes a nut axially retaining the rotor stack. The power turbine yet further includes a Vernier ring engaged with the nut and the rotor shaft, the Vernier ring having an inner ring, a plurality of inner tabs extending radially inward from the inner ring, and a plurality of outer tabs extending radially outward from the inner ring, the Vernier ring formed of at least two ring segments.

In addition to one or more of the features described above, or as an alternative, further embodiments may include an outer ring, the plurality of outer tabs extending between, and connecting, the inner ring and the outer ring.

In addition to one or more of the features described above, or as an alternative, further embodiments may include that each of the plurality of inner tabs are disposed within one of a plurality of corresponding slots defined by the rotor shaft.

In addition to one or more of the features described above, or as an alternative, further embodiments may include that each of the plurality of outer tabs are disposed between adjacent protrusions extending from the nut.

In addition to one or more of the features described above, or as an alternative, further embodiments may include that the inner ring, the outer ring, and adjacent outer tabs define a plurality of windows of the Vernier ring, each of the protrusions of the nut disposed within one of the plurality of windows.

In addition to one or more of the features described above, or as an alternative, further embodiments may include that the power turbine rotor assembly is disposed on a helicopter.

In addition to one or more of the features described above, or as an alternative, further embodiments may include that the Vernier ring is disposed in a high pressure turbine section of the gas turbine engine.

In addition to one or more of the features described above, or as an alternative, further embodiments may include that the Vernier ring is disposed in an intermediate pressure turbine section of the gas turbine engine.

In addition to one or more of the features described above, or as an alternative, further embodiments may include that the Vernier ring is disposed in a low pressure turbine section of the gas turbine engine.

In addition to one or more of the features described above, or as an alternative, further embodiments may include that the Vernier ring is disposed in a compressor section of the gas turbine engine.

In addition to one or more of the features described above, or as an alternative, further embodiments may include that the power turbine section is disposed in an aircraft.

BRIEF DESCRIPTION OF THE DRAWINGS

The following descriptions should not be considered limiting in any way. With reference to the accompanying drawings, like elements are numbered alike:

FIG. 4 is a perspective view of the Vernier ring of FIG. 3 in an assembled condition;

FIG. 5 is an end view of the Vernier ring of FIG. 3 in the assembled condition;

DETAILED DESCRIPTION

A detailed description of one or more embodiments of the disclosed apparatus and method are presented herein by way of exemplification and not limitation with reference to the Figures.

Figure 1:
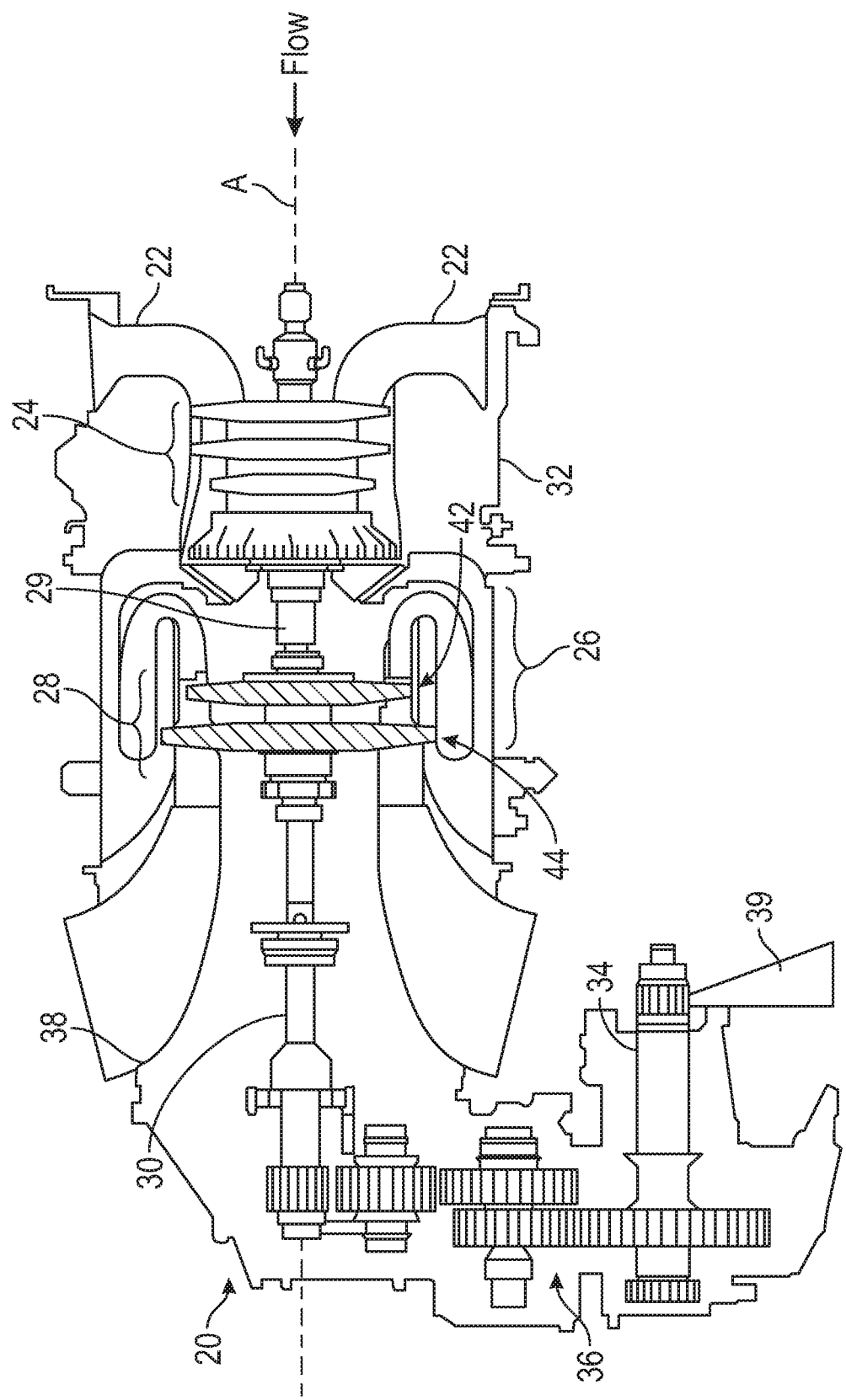
FIG. 1 is a schematic view of a gas turbine engine having a gas generator turbine section and a power turbine section.

FIG. 1 schematically illustrates a gas turbine engine 20. In the illustrated embodiment, the engine 20 is a turboshaft engine, such as for a helicopter. The engine 20 includes an inlet duct 22, a compressor section 24, a combustor section 26, and a turbine section 28. The compressor section 24 is an axial compressor and includes a plurality of circumferentially-spaced blades. Similarly, the turbine section 28 includes circumferentially-spaced turbine blades. The compressor section 24 and the turbine section 28 are mounted on a main shaft 29 for rotation about an engine central longitudinal axis A relative to an engine static structure 32 via several bearing systems (not shown).

During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which may include first and second turbine 42, 44.

The first turbine 42 rotationally drives the compressor section 24 via a main shaft 29. Together these components provide a gas generator portion of the engine 20. The second turbine 44, which is a power turbine in the example embodiment, is located aft or downstream of the first turbine 42 and rotationally drives a power shaft 30, gearbox 36, and output shaft 34. Although fluidly coupled to the gas generator portion, the power turbine 44 is mechanically disconnected from the gas generator portion. That is, the main shaft 29 and power shaft 30 are not connected to one another, such that the shafts 29, 30 rotate separately and at different speeds. Moreover, there are no compressors mounted to the power shaft 30. The power turbine 44 can be made up of a single or multiple stages of blades and vanes. The output shaft 34 rotationally drives the helicopter rotor blades 39 used to generate lift for the helicopter. The hot gas stream is expelled through an exhaust 38.

The power turbine 44 includes stages of stator vanes axially spaced apart from one another and supported with respect to the turbine case structure 46, which is part of the engine static structure 32. Stages of rotor blades 50 are axially interspersed between the stages of stator vanes 48.

Figure 2:
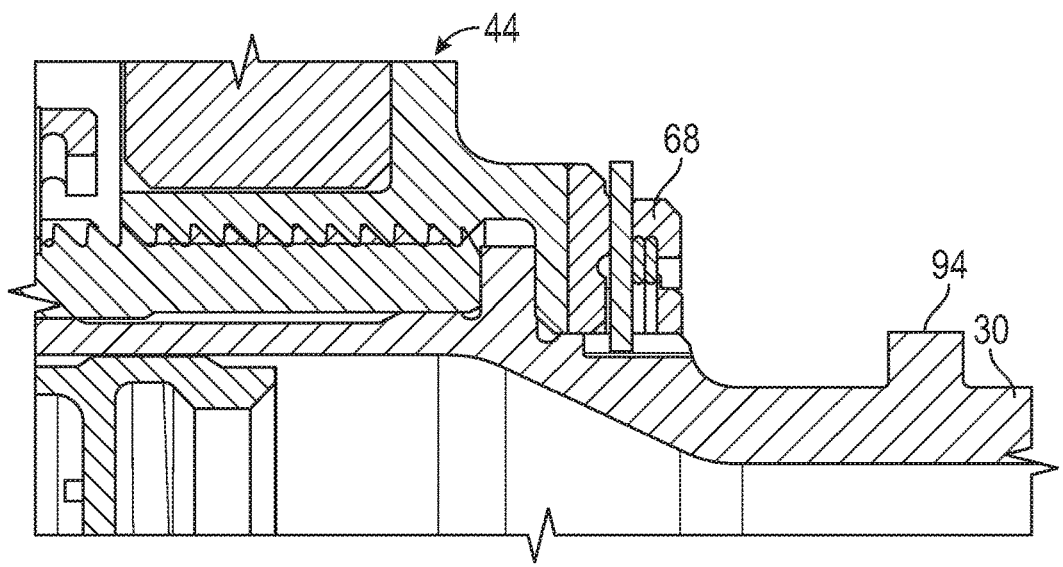
FIG. 2 is a perspective view of an aft region of the power turbine section.

Referring now to FIG. 2, a portion of the power turbine 44 is illustrated in greater detail. In particular, an aft region of the power turbine 44, as well as the power shaft 30, are shown. As described above, the power turbine 44 may include one or more rotor stages. Regardless of the number of rotor stages, each of the rotor stages are configured for attachment at a radially outer portion thereof to a plurality of rotor blades. Together, the rotor stages form a turbine rotor stack assembly. Upon reaching a desired axial position of the overall power turbine rotor assembly, the axial position of the turbine rotor stack assembly is fixed with a nut 68. A torque is applied to the nut 68 to apply a high axial preload on the rotor stack to keep the overall power turbine rotor assembly tightly fit together. The nut 68 must have one or more structural features that provide anti-rotation of the nut 68 to prevent the nut from unwinding during operation due to vibration.

Figure 3:
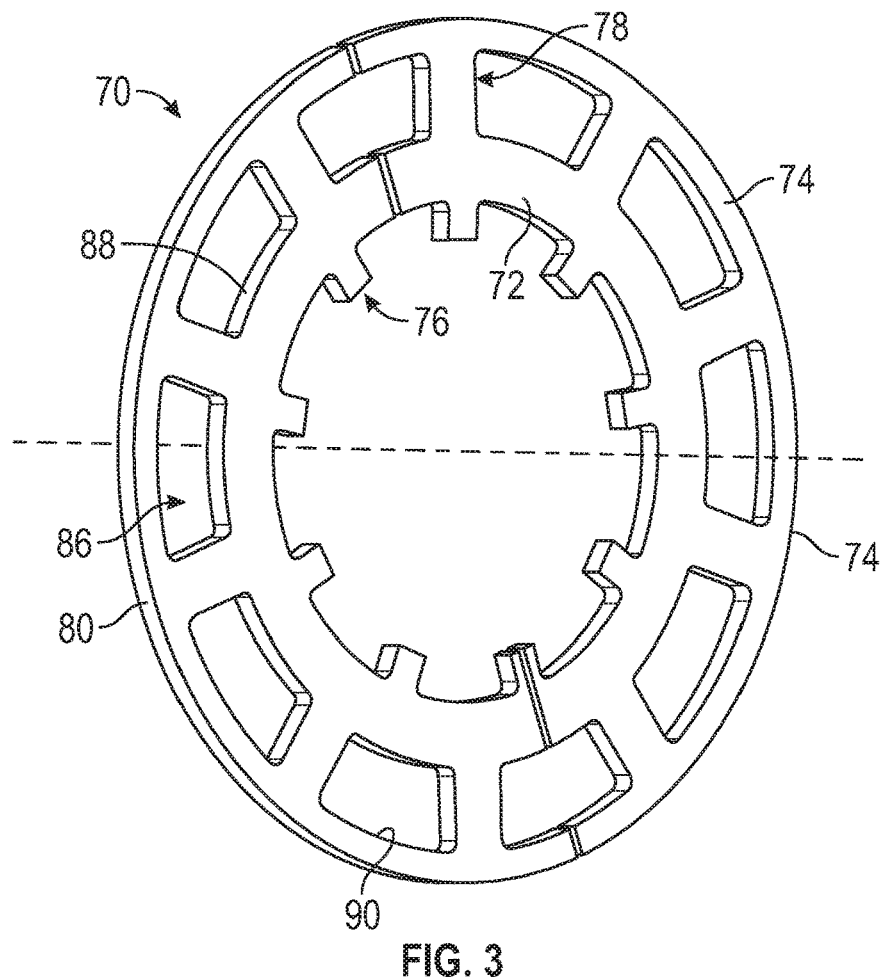
FIG. 3 is a perspective view of a split Vernier ring for attachment to the aft region of the power turbine section according to one aspect of the disclosure.

Referring now to FIGS. 3-5, a Vernier ring 70 is illustrated. The Vernier ring 70 includes an inner ring 72 and an outer ring 74. The inner ring 72 and the outer ring 74 are substantially concentric rings, with the inner ring 72 located radially inward of the outer ring 74. A plurality of inner tabs 76 extend radially inward from the inner ring 72, with the inner tabs 76 circumferentially spaced from each other. In some embodiments, the inner tabs 76 are equally spaced from each other in the circumferential direction. A plurality of outer tabs 78 extend between the inner ring 72 and the outer ring 74 in a manner that structurally connects the inner ring 72 and the outer ring 74. In some embodiments, the outer tabs 78 are equally spaced from each other in the circumferential direction. It is to be understood that the number of inner tabs 76 and outer tabs 78 may vary depending on the particular application, such that the illustrated example is merely illustrative of one embodiment of the Vernier ring 70.

The Vernier ring 70 may be referred to as a "split ring" or "split Vernier ring" herein, as the Vernier ring 70 is formed with two or more ring segments. In the illustrated example, the Vernier ring 70 includes a first ring segment 80 and a second ring segment 82. The locations of the split may vary from that illustrated. For example, in some embodiments, the split may occur at the inner and/or outer tabs 76, 78, or may occur between such tabs 76, 78 and extend only through the inner and outer rings 72, 74. Although illustrated and described as being formed of only two ring segments, it is to be appreciated that the Vernier ring 70 may be formed of more than two ring segments. It is to be noted that a split resulting in symmetric ring segments allows for a single part number to be used.

The Vernier ring 70 is shown in an assembled/installed condition in FIGS. 2 and 4. In the assembled condition, the inner tabs 76 are disposed within corresponding slots 84, or recesses, formed in an outer diameter of the power shaft 30. A plurality of windows 86 formed in the Vernier ring 70 are each defined by an outer surface 88 of the inner ring 72, an inner surface 90 of the outer ring 74, and sidewalls of adjacent outer tabs 78. The plurality of windows 86 surround a protrusion 92, such as a bent tab or the like, extending rearward from the nut 68 to provide anti-rotation for the nut 68. The protrusions 92 at least partially hold a retaining ring disposed around the power shaft 30.

One or more radial protrusions 94 extending radially outward from the power shaft 30 may impede sliding the Vernier ring 70 to the assembled condition due to the possibility that the radial protrusions 94 extend further outward radially, relative to a radial position of the slots 84 of the power shaft 30 which the inner tabs 76 must be positioned within. The radial protrusions 94 may be any protruding feature extending from the power shaft 30, such as knife edge teeth, speed sensor teeth, or the like. By splitting the Vernier ring 70 into two or more segments, such as the first ring segment 80 and the second ring segment 82, the Vernier ring 70 can avoid the possibility of the inner tabs 76 being disturbed by the radial protrusions 94 of the power shaft 30 during assembly. In assembly, the first ring segment 80 and the second ring segment 82 of the Vernier ring 70 are moved into desired position relative to the slots 84 of the power shaft 30 and the protrusions 92 of the nut 68, while avoiding the radial protrusions 94 entirely.

Figure 6:
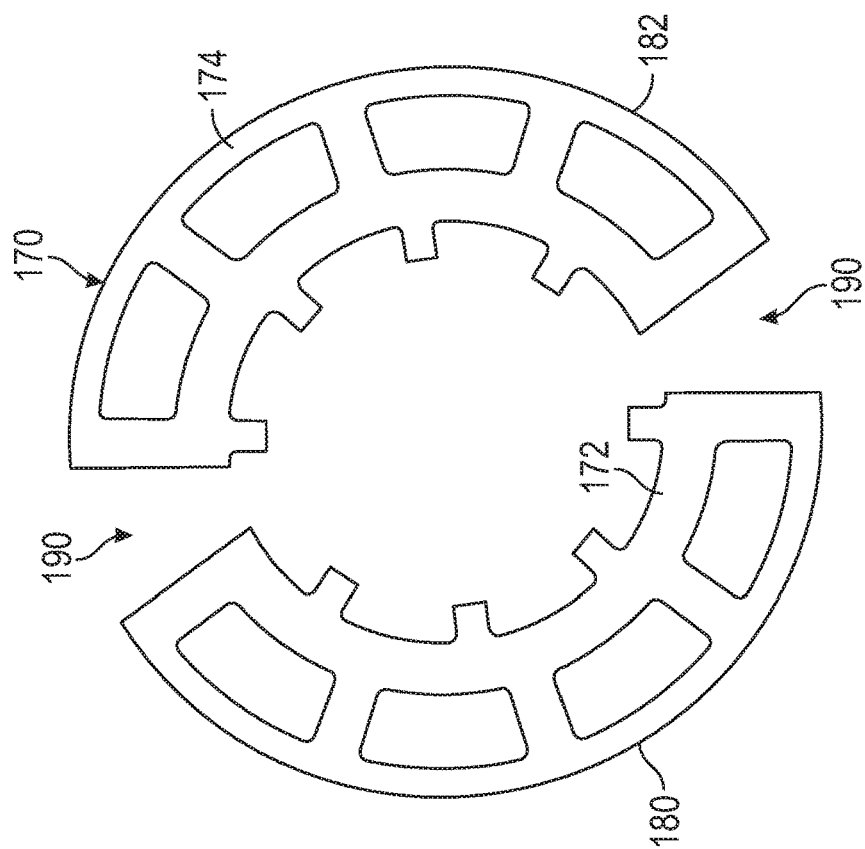
FIG. 6 is a perspective view of the Vernier ring in an assembled condition according to another aspect of the disclosure.
Figure 7:
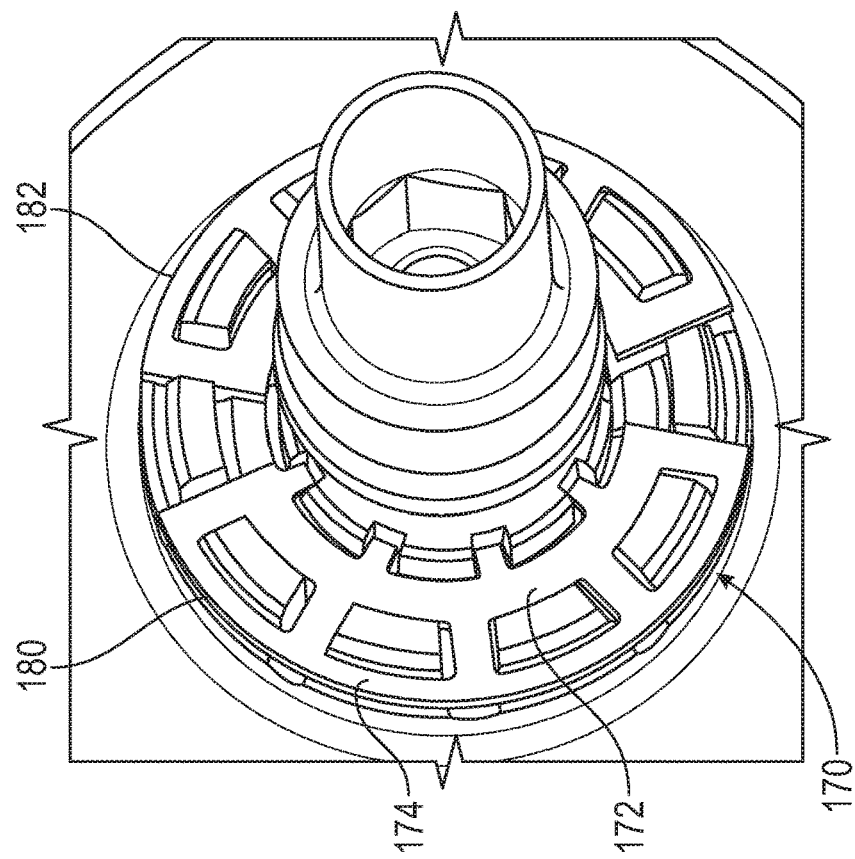
FIG. 7 is an end view of the Vernier ring of FIG. 6 in the assembled condition.

Referring now to FIGS. 6 and 7, the Vernier ring is illustrated according to another aspect of the disclosure and is referenced with numeral 170. The illustrated Vernier ring 170 includes a first ring segment 180 and a second ring segment 182, but the inner ring 172 and the outer ring 174 do not extend circumferentially to the same extent of the embodiment of FIGS. 3-5. As shown, two segments of the Vernier ring 170 have been removed to reduce weight and material cost. The segments removed are referenced with numeral 190. All other structural features are similar to that of the Vernier ring 70 illustrated in FIGS. 3-5 and duplicative description is not necessary to facilitate proper understanding of the embodiments.

Although the embodiments described above include an outer ring 74, 174, it is to be understood that some embodiments of the Vernier ring do not require such a structural feature. In particular, the Vernier ring 70, 170 only includes the inner ring 72, 172, the inner tabs 72 and the outer tabs 74. The outer ring 74 provides additional stability, but some applications of use may not require the outer ring 74.

The illustrated embodiments, and description above, relate to use of the Vernier ring in a power turbine 44, but it is to be understood that the embodiments of the split Vernier ring described herein may be beneficial to any rotating hardware-to-shafting connection that requires anti-rotation of a nut. For example, in a gas turbine engine context, this may include a high pressure turbine, an intermediate pressure turbine, a low pressure turbine, compressors, etc. As such, the illustrated example of a power turbine 44 application is not limiting of the uses for the split Vernier ring.

The embodiments described herein provide all benefits of a traditional Vernier ring, however, also add the capability of being installed in locations where other features would prevent a traditional ring to be installed. Additionally, embodiments of the Vernier ring described herein allow for the use of a single part number where the splitting of the Vernier ring results in symmetrical ring segments, is easily manufactured, and can easily be applied to an already designed Vernier ring.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power turbine rotor assembly comprising:
a rotor shaft;
a rotor stack surrounding the rotor shaft;
a nut axially retaining the rotor stack; and
a split ring engaged with the nut and the rotor shaft, the split ring formed from two separate ring segments such that a split exists between each of the two separate ring segments, each of the two separate ring segments having;
an inner ring,
an outer ring,
a plurality of inner tabs extending radially inward from the inner ring, the inner tabs circumferentially spaced from each other; and
a plurality of outer tabs extending between, and connecting, the inner ring and the outer ring; and
Wherein the inner ring, the outer ring, and adjacent outer tabs of the plurality of outer tabs define a plurality of windows of the split ring.

2. The power turbine rotor assembly of claim 1, wherein each of the plurality of inner tabs are disposed within one of a plurality of corresponding slots defined by the rotor shaft.

3. The power turbine rotor assembly of claim 1, wherein each of the plurality of outer tabs are disposed between adjacent protrusions extending from the nut.

4. The power turbine rotor assembly of claim 3, wherein each of the protrusions of the nut are disposed within one of the plurality of windows.

5. The power turbine rotor assembly of claim 1, wherein the power turbine rotor assembly is disposed on a helicopter.

6. The split ring of claim 1, wherein the split surrounds at least one protrusion extending from the nut.

7. A split ring formed from two separate ring segments such that a split exists between each of the two separate ring segments, each of the two separate ring segments having:
an inner ring;
an outer ring;
a plurality of inner tabs extending radially inward from the inner ring, the inner tabs circumferentially spaced from each other; and
a plurality of outer tabs extending between, and connecting, the inner ring and the outer ring, wherein the inner ring, the outer ring, and adjacent outer tabs of the plurality of outer tabs define a plurality of windows of the split ring.

8. The split ring of claim 7, wherein the split ring is disposed on a helicopter.

9. The split ring of claim 7, wherein the split is located in at least one of the plurality of outer tabs.

10. A gas turbine engine comprising:
a gas generator turbine section; and
a power turbine section arranged fluidly downstream from the gas generator turbine section, the power turbine section mechanically disconnected from the gas generator turbine section, the power turbine section comprising:
a rotor shaft;
a rotor stack surrounding the rotor shaft;
a nut axially retaining the rotor stack; and
a split ring engaged with the nut and the rotor shaft, the split ring formed from two separate ring segments such that a split exists between each of the two separate ring segments, each of the two separate ring segments having;
an inner ring,
an outer ring,
a plurality of inner tabs extending radially inward from the inner ring, the inner tabs circumferentially spaced from each other; and
a plurality of outer tabs extending between, and connecting, the inner ring and the outer ring; and
Wherein the inner ring, the outer ring, and adjacent outer tabs of the plurality of outer tabs define a plurality of windows of the split ring.

11. The gas turbine engine of claim 10, wherein the split is located in at least one of the plurality of inner tabs.

12. The gas turbine engine of claim 10, wherein each of the plurality of outer tabs are disposed between adjacent protrusions extending from the nut.

13. The gas turbine engine of claim 12, wherein each of the protrusions of the nut are disposed within one of the plurality of windows.

14. The gas turbine engine of claim 10, wherein the gas turbine engine is disposed on a helicopter.

15. The gas turbine engine of claim 10, wherein the split ring is disposed in a high pressure turbine section of the gas turbine engine.

16. The gas turbine engine of claim 10, wherein the split ring is disposed in an intermediate pressure turbine section of the gas turbine engine.

17. The gas turbine engine of claim 10, wherein the split ring is disposed in a low pressure turbine section of the gas turbine engine.

18. The gas turbine engine of claim 10, wherein the Vernier split ring is disposed in a compressor section of the gas turbine engine.

19. The gas turbine engine of claim 10, wherein the power turbine section is disposed in an aircraft.

* * * * *